United States Patent
Bennett et al.

(10) Patent No.: US 7,769,263 B1
(45) Date of Patent: Aug. 3, 2010

(54) OPTICAL FIBER AND A METHOD FOR MAKING SUCH

(75) Inventors: Randy Lee Bennett, Painted Post, NY (US); Scott Robertson Bickham, Corning, NY (US); Jeffrey Coon, Wilmington, NC (US); Leonard Charles Dabich, II, Painted Post, NY (US); Daniel Warren Hawtof, Corning, NY (US); Joseph Edward McCarthy, Addison, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/364,045

(22) Filed: Feb. 2, 2009

(51) Int. Cl.
  *G02B 6/032* (2006.01)
  *C03B 37/027* (2006.01)
  *G02B 6/02* (2006.01)

(52) U.S. Cl. .......... 385/125; 385/126; 65/393; 65/427; 65/435

(58) Field of Classification Search .......... 65/393, 65/414, 416, 427, 435; 385/123–128
  See application file for complete search history.

(56) References Cited

U.S. PATENT DOCUMENTS

| | | | |
|---|---|---|---|
| 5,802,236 A | 9/1998 | DiGiovanni et al. | 385/127 |
| 6,243,522 B1 | 6/2001 | Allan et al. | 385/123 |
| 6,705,126 B2 * | 3/2004 | Paek et al. | 65/395 |
| 6,917,741 B2 * | 7/2005 | Fekety et al. | 385/125 |
| 7,228,040 B2 | 6/2007 | Nakajima et al. | 385/125 |
| 7,418,836 B2 * | 9/2008 | Dong et al. | 65/393 |
| 2002/0178761 A1 * | 12/2002 | Cummings et al. | 65/417 |
| 2005/0094954 A1 | 5/2005 | Pickrell et al. | 385/123 |
| 2005/0238307 A1 * | 10/2005 | Hansen et al. | 385/125 |
| 2006/0034574 A1 | 2/2006 | Guan et al. | 385/125 |
| 2006/0120677 A1 * | 6/2006 | Broeng et al. | 385/125 |

FOREIGN PATENT DOCUMENTS

WO     02/14946     2/2002

OTHER PUBLICATIONS

"Holey fibers with randomly arranged air holes"; Monro et al; Cleo 2000; p. 607-608, (2000).
"Bending-Insensitive Single-Mode Hole-Assisted Fibers with Reduced Splice Loss"; Tsuchida, et al; 2005 Conferences on Lasers & Electro-Optics (CLEO); p. 384-386, (2005).

* cited by examiner

*Primary Examiner*—Daniel Petkovsek
(74) *Attorney, Agent, or Firm*—Svetlana Z. Short

(57) ABSTRACT

An optical fiber comprising: (i) a core; (ii) a cladding surrounding the core; wherein the cladding comprises a cladding ring that: (a) has a width W equal to or less than 10 microns; (b) includes at least 50 airlines, each airline having a maximum diameter or a maximum width of not more than 2 microns and more than 50% of said airlines have a length of more than 20 m; (c) has an air fill fraction of 0.1% to 10%, and (d) has an inner radius $R_{in}$ and an outer radius $R_{out}$, wherein 6 µm $\leq R_{in} \leq$ 14 µm, and 8 µm $\leq R_{out} \leq$ 14 µm; and (iii) an outer cladding surrounding said cladding ring.

15 Claims, 6 Drawing Sheets

OPTICAL FIBER AND A METHOD FOR MAKING SUCH

BACKGROUND

1. Field of the Invention

The present invention relates generally to optical fibers, and particularly to optical fibers with airline features, and to a method of manufacturing such fibers.

2. Technical Background

Corning, Inc introduced a new optical fiber, ClearCurve® optical fiber, in 2007. This fiber has improved bend performance due to gas filled voids randomly situated in an annular region surrounding the core of the fiber. The gas filled voids are randomly distributed and are created by trapping gas in the soot during sintering of the preform. The gas filled voids are elongated as the preform is drawn into fiber. These gas filled voids do not extend over the entire length of the fiber and are typically less than 10 m in length.

Photonic crystal fibers and photonic band gap fibers (PCFs and PBGFs) are usually created by a "stack and draw" method. The term "stack and draw" refers to assembling a preform from constituent parts using, for example, small tubes and/or rods with round or hexagonal cross-sections, and stacking them together in a precise orientation. These stacked components are usually situated inside an overclad tube. The overclad tube with the stacked components is then either collapsed and pulled into intermediate preform parts, or directly drawn into an optical fiber. The preform may also be etched to enlarge the inside diameters of the small tubes in order to change the ratio of glass to air in a cross section of the preform, to enhance optical properties of the fiber.

PCFs and PBGFs are expensive to make, because in order to propagate light properly, they require a great amount of precision in placement of different preform components (e.g., core rod(s), and the glass tubes surrounding the core rod(s). The preform components such as the overclad tube and the small glass tubes surrounding the core rod(s) are typically expensive and contribute to the cost of making these fibers. In addition, PCFs and PBGFs are expensive due to the relatively small amount of fiber resulting per preform assembly (when compared to a standard optical transmission fiber preform making processes), resulting from the relatively small size of the optical preforms.

SUMMARY

One aspect of the invention is an optical fiber comprising: (i) a core; (ii) a cladding surrounding the core; and (iii) an outer cladding. The cladding includes a cladding ring that: (a) has a width W equal to or less than 10 microns; (b) not greater than 10 microns; (b) comprises at least 50 airlines, each airline having a maximum diameter or maximum width of no more than 2 microns; (c) has an air filled fraction of 0.1% to 10%, and (d) has an inner radius $R_{in}$ and an outer radius $R_{out}$, wherein $6\ \mu m \leq R_{in} \leq 14\ \mu m$, and $8\ \mu m \leq R_{out} \leq 14\ \mu m$. According to some embodiments, the width W is 3 μm to 6 μm ($W = R_{out} - R_{in}$). Preferably, the cladding ring includes at least 75 airlines, and more preferably at least 100 airlines. Preferably, most (more than 50%), or all of the airlines are continuous along the axis of the optical fiber.

One example of the present invention is an optical fiber comprising: a glass core, a first cladding, a second cladding and an outer cladding; wherein the second cladding is the cladding ring that comprises at least 100 airlines. Preferably, the cross-sectional diameter d of the airlines is 0.5 μm to 2 μm, for example 0.75 μm to 1.5 μm. Preferably the length of most or all of the airlines is greater than 20 m, and more preferably greater than 100 m.

In another aspect, the present invention includes a method for making an optical fiber, said method comprising the steps of:
  (i) wrapping a sintered core blank with a rod ribbon containing at least 100 glass:
    (a) rods, (b) tubes, or (c) a combination of rods and tubes, to produce a wrapped preform;
  (ii) heating the wrapped preform so as to attach each of the rods or tubes to (a) the core blank and/or (b) to at least one other rod or tube, thereby creating a core blank assembly;
  (iii) re-drawing the core blank assembly to produce a cane.

According to the exemplary embodiments described herein the cane has a smaller diameter than the wrapped preform or the core blank assembly.

According to some preferred embodiments of the present invention, the fiber cane is overclad with glass soot; and consolidated to create the final preform blank.

An advantage of the method of making fiber according to the present invention is that this method is less expensive than the "stack and draw" process of making a fiber. The stack and draw manufacturing process is a high cost process. There are three high cost elements contributing to the high cost of the stack and draw process. These are: 1) the cost of tubes in the stack, 2) the manual labor associated with assembling the structure, and 3) the overclad tube cost. The exemplary embodiments of the method of making optical fiber according to the present invention advantageously: (i) eliminate one or more (and preferably all three) of these high cost elements, and (ii) are capable of producing large size preforms, which contribute to low cost through high equipment utilization that lowers fixed costs of equipment operators and equipment downtime between set-ups.

During the photonic band gap (PBG) fiber manufacturing processes, when assemblies of rods or tubes are redrawn, the interstitial holes are closed. More specifically, the PBG manufacturing process typically utilizes a vacuum pull (negative pressure) during fiber draw (and preform blank redraw) in order to collapse the interstitial holes between the tubes and rods. A fiber drawn or preform blank redrawn with a very low torque could also collapse the interstitial holes, but with the adverse effect of lowering the air-fill fraction created by the tubes. However, because it is desired that PBG fibers have a high air-filled fraction, low torque (T<10 Nm) draw or re-draw steps are not utilized in manufacturing of PBG fibers. In contrast, according to some embodiments of the present invention, high torque (e.g., T>15 Nm, T>25 Nm, or T=15-100 Nm) is utilized to keep the interstitial holes open. According to some exemplary embodiments of the present invention, the core blank assembly and/or preform blank is capped during redraw and/or the fiber draw process, or is pressurized (positive pressure is applied) in order to keep the interstitial holes open. Capping to trap interstitial gasses or pressurizing interstitial gaps to keep the interstitial holes open is the opposite of pulling the vacuum (which collapses the interstitial holes).

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into, and constitute a part of, this specification. The drawings illustrate various embodiments of the invention, and together with the description serve to explain the principles and operations of the invention.

DETAILED DESCRIPTION OF THE EMBODIMENTS

Reference will now be made in detail to the present preferred embodiments of the invention, examples of which are illustrated in the accompanying drawings. Whenever possible, the same reference numerals will be used throughout the drawings to refer to the same or like parts. One embodiment of the optical fiber of the present invention is shown schematically in FIG. 1A, and is designated generally throughout by the reference numeral 10.

One embodiment of the optical fiber 10 comprises a core 12 and a cladding 16 surrounding the core 12. The cladding 16 comprises an annular region, referred to as a cladding ring 18 herein. The cladding ring 18: (a) has a width W not greater than 10 microns; (b) includes at least 50 airlines 20 (also referred to herein as air holes), each airline 20 having a maximum diameter d or a maximum width w of not more than 2 microns; and (c) has an inner radius $R_{in}$ and an outer radius $R_{out}$. According to some embodiments, 6 µm≦$R_{in}$≦14 µm, and 8 µm≦$R_{out}$≦14 µm. According to some embodiments, 0.5 µm≦d≦2 µm or 0.5 µm≦w≦2 µm. For example, in some embodiments, 0.75 µm≦d≦1.5 µm. Preferably, the cladding ring 18 includes at least 75 airlines, and more preferably at least 100 airlines. In some embodiments the cladding ring 18 includes at least 200 airlines. The exemplary optical fibers 10 of FIG. 1A also include an outer cladding 30 surrounding the cladding 16. Preferably, the airlines 20 are substantially continuous along the length of the fiber 10. For example, according to at least some the embodiments of the present invention, the length of most (>50%) air holes 20 is greater than 20 m, and is typically greater than 50 m. In the exemplary embodiments described herein the length of most air holes 20 is greater than 100 m. Advantageously, the optical fiber 10 according to the embodiments of the present invention can be designed to offer similar optical performance and similar low losses as those obtainable with a fiber such as ClearCurve® optical fiber available from Corning Inc.

For example, one embodiment of the optical fiber 10 (see FIG. 1A) comprises: a glass (e.g., silica based, Ge doped) core 12; a cladding 16 including a first (optional) cladding region 14 and a cladding ring 18 with airlines 20; and an outer cladding 30. Although in the exemplary embodiments the core 12 contains between 3 and 9 wt % $GeO_2$, the core 12 may also utilize other dopants. The core 12 of this exemplary fiber 10 has an outer diameter of 9 µm, and a relative refractive index between 0.2% and 0.5% with respect to the outer cladding 30. Although in this exemplary embodiment the core 12 is single-moded, in other embodiments the core 12 may be either single-moded or multi-moded, and may be either a step index core (see FIG. 1B, solid line), or a graded index core (see FIG. 1B, dashed line). In the exemplary embodiment of FIG. 1A, the first cladding region 14 has an outer diameter of 22.5 µm, and is made of pure silica. However, the first cladding region 14 can also include other dopants in order to increase, or to decrease its index of refraction relative to that of pure silica. The outer diameter of the first cladding region 14 is preferably between 16 and 27 µm. In some exemplary embodiments, the first cladding region 14 has a maximum relative refractive index less than 0.05% and a minimum relative refractive index greater than −0.05%. According to some exemplary embodiments, the silica based cladding ring 18 containing airlines has a width W of less than 10 microns. The width W may be, for example, between 2 µm and 8 µm and more preferably is between 3 µm and 6 µm, e.g., 2.2 µm, 2.5 µm, 3 µm, 3.5 µm, 4 µm, 4.5 µm, 5 µm, 5.5 µm or 6 µm. In this embodiment the width W of the cladding ring 18 is about 3 µm. In some embodiments the cladding ring 18 includes at least 100 airlines 20. The cladding ring 18 may comprise silica doped with at least one dopant selected from the group comprising: germanium, aluminum, phosphorous, titanium, boron, and/or fluorine. Each airline 20 of this exemplary embodiment has a maximum diameter d (or, for airlines with a non-circular or non-elliptical cross-section, maximum width w of no more than 2 µm (e.g., 0.5 µm to 2 µm). In the exemplary fiber 10 depicted in FIG. 1A the cladding ring 18 includes four rows of microstructures 18A (silica micro-rods, with airlines 20 situated between the micro-rods) and the outer cladding 30 which is made of pure (i.e., undoped) silica. The outer cladding 30 of this exemplary embodiment has an outer diameter of 125 µm.

Figure 1A:
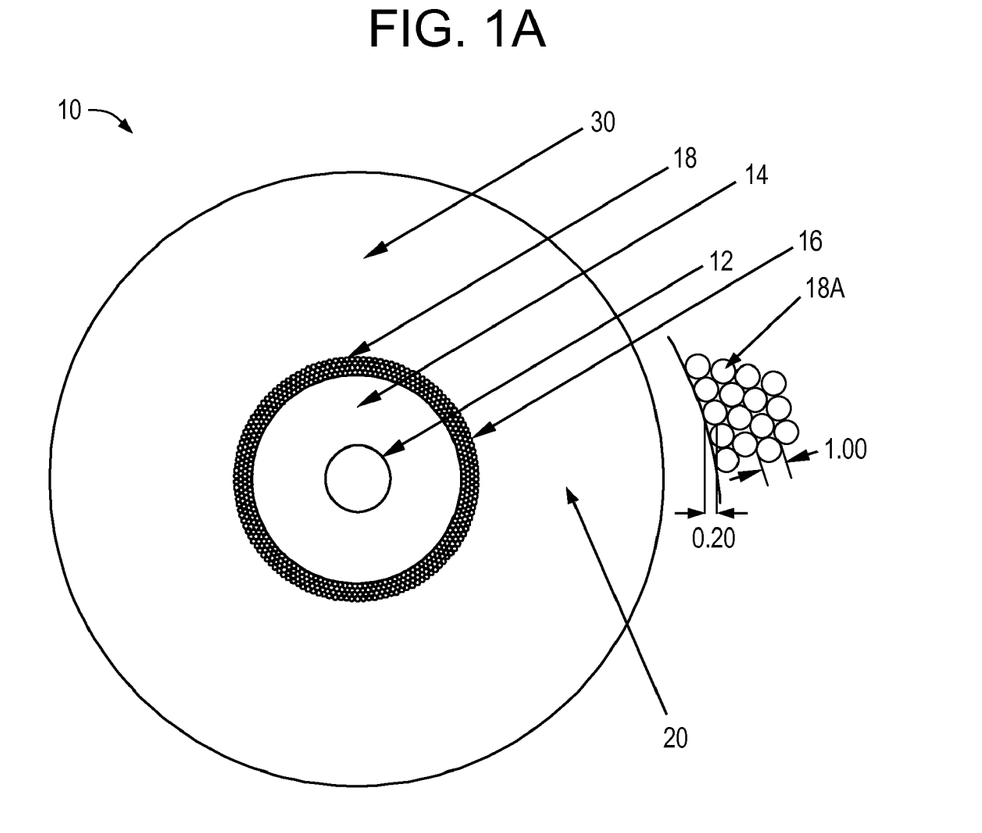
FIG. 1A is a schematic cross-sectional view of one embodiment of the optical fiber of the present invention.

Other embodiments may utilize fewer or more rows of rods and/or tubes, for example, 2-20 rows of rods and/or tubes, preferably 2-10 rows, more preferably 3-8 rows, and even more preferably 3-6 rows. It is noted that although the rods 18A in this exemplary embodiment were made of pure silica, the rods 18A (or optional tubes 18B (not shown)) can be also be made from other optical glasses or from silica doped with at least one dopant selected from the group comprising: germanium, aluminum, phosphorous, titanium, boron, and fluorine.

This exemplary optical fiber 10 of FIG. 1A has a cable cutoff wavelength less than 1260 nm, zero dispersion wavelength of between 1302 nm and 1324 nm, and mode field diameter at 1310 nm between 8.0 and 10.0 microns.

Some of the advantageous features of fiber 10 of FIG. 1A include: (a) presence of a first (inner) cladding region 14 between the Ge-doped core and the airline filled cladding ring 18; and (b) a large number (more than 50) of small airlines 20 with a maximum width of no more than 2 µm. The first cladding region 14 of the optical fiber 10 of FIG. 1A advantageously centers the zero-dispersion wavelength in the G.652 window (1302 nm-1324 nm) and reduces the optical power and scattering losses in the airline region. The large number of small airlines 20 enables a low cable cutoff wavelength (below 1260 nm) and improves the rotational symmetry of the air filled fraction (AFF) in the cladding ring 18.

Some embodiments of fiber 10 have the air fill fraction (AFF) of 0.1%≦AFF≦10%. This range of AFF is: 1) high enough to advantageously contribute to good bend loss performance, for example, less than 1 dB/turn when bent around a 10 mm diameter mandrel, and/or less than 0.2 dB/turn when bent around a 20 mm diameter mandrel, and 2) low enough to provide a low cable cutoff wavelength λc of no more than then 1500 nm (e.g., λc<1500 nm, or λc<1400 nm, or λc<1260 nm).

Figure 1B:
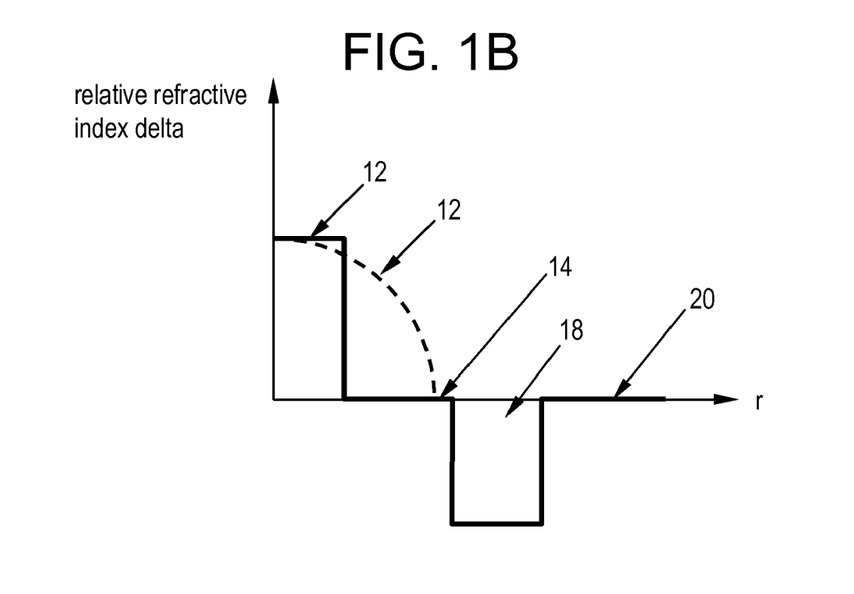
FIG. 1B is a schematic illustration of a relative refractive index profile of the optical fiber of FIG. 1A.

The exemplary multimode optical fiber 10 of FIG. 1B has a graded index core with a diameter greater than 40 μm, for example 47 to 53 μm, 60-65 μm, greater than 70 μm or in some cases greater than 90 μm. The maximum relative refractive index of the graded index core is preferably greater than 0.8%, e.g. greater than 0.9%, between 0.9 and 1.1%, between 0.9 and 1.0%, between 1.4 and 1.6% or between 1.8 and 2.2%.

The numerical aperture of the fiber is preferably greater than 0.18, e.g. 0.185 to 0.215, greater than 0.24, greater than 0.27, or 0.27 to 0.30. The overfilled bandwidth at 850 nm is preferably greater than 500 MHz-km, e.g. greater than 750 MHz-km, greater than 1000 MHz-km, or greater than 1500 MHz-km. The overfilled bandwidth at 1300 nm is preferably greater than 400 MHz-km, e.g. greater than 500 MHz-km, greater than 700 MHz-km, or greater than 1000 MHz-km.

The multimode fiber 10 of FIG. 1B also includes a large number (more than 50) of small airlines 20 with a maximum width of no more than 2 μm. Some embodiments of fiber 10 have the air fill fraction (AFF) of 0.1%≦AFF≦10%. This range of AFF is: 1) high enough to advantageously contribute to good bend loss performance, for example, less than 1 dB/turn when bent around a 10 mm diameter mandrel, and/or less than 0.2 dB/turn when bent around a 20 mm diameter mandrel The addition of cladding region 14 between the graded index core and the airline filled cladding ring 18 may increase the bandwidth at 850 nm by tuning the dispersion of the outer mode groups, as described in U.S. patent application Ser. No. 12/250,987 filed Oct. 14, 2008, which is incorporated by reference in its entirety herein. The width of the cladding region 14 is preferably greater than 0.5 μm and less than 3 μm, e.g. between 0.5 and 2.5 μm, between 0.5 and 2.0 μm or between 0.8 and 1.8 μm.

Figure 1C:
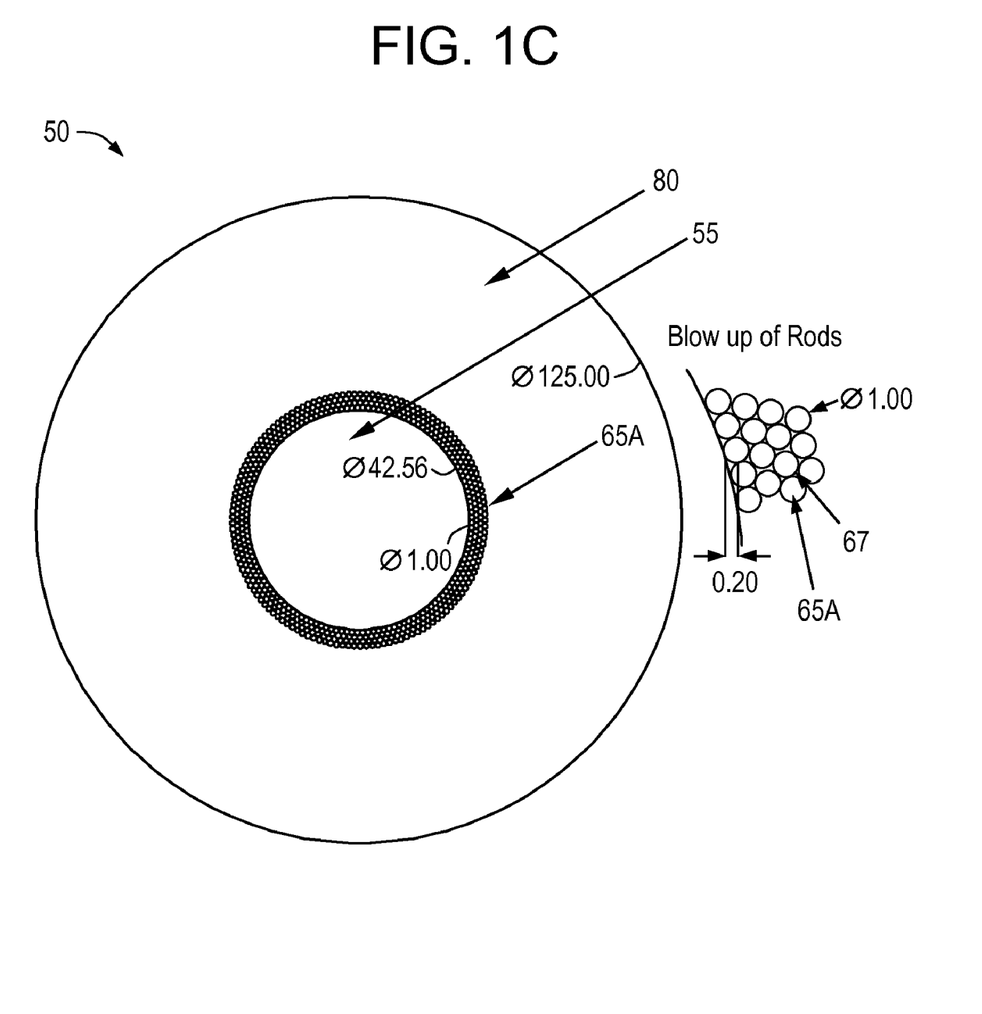
FIG. 1C is a schematic cross-sectional view of one embodiment of the preform blank for making the optical fiber of FIG. 1A.

An exemplary fiber preform blank 50 for making optical fiber 10 is shown schematically in FIG. 1C. The preform blank 50 of FIG. 1C includes sintered core blank 55 (D of 42.6 μm) surrounded by a plurality of glass rods 65A (typically 2 to 10 layers of glass rods) and an overclad silica based layer 80. Preferably, the number of glass rod layers surrounding the core blank 55 is 2 to 5. However, in other embodiments, the core blank 55 may be of a different size, and may include, for example a relatively large gradient index core portion with a small pure silica layer surrounding this portion, or a relatively small core portion with a relatively large layer corresponding to the first cladding region 14 of the fiber 10. This embodiment includes 4 layers of glass rods 65A. It is noted that although glass tubes 65B (not shown) may be used instead of the glass rods, glass rods are significantly less expensive than glass tubes, and are adequate for most applications.

Figure 2:
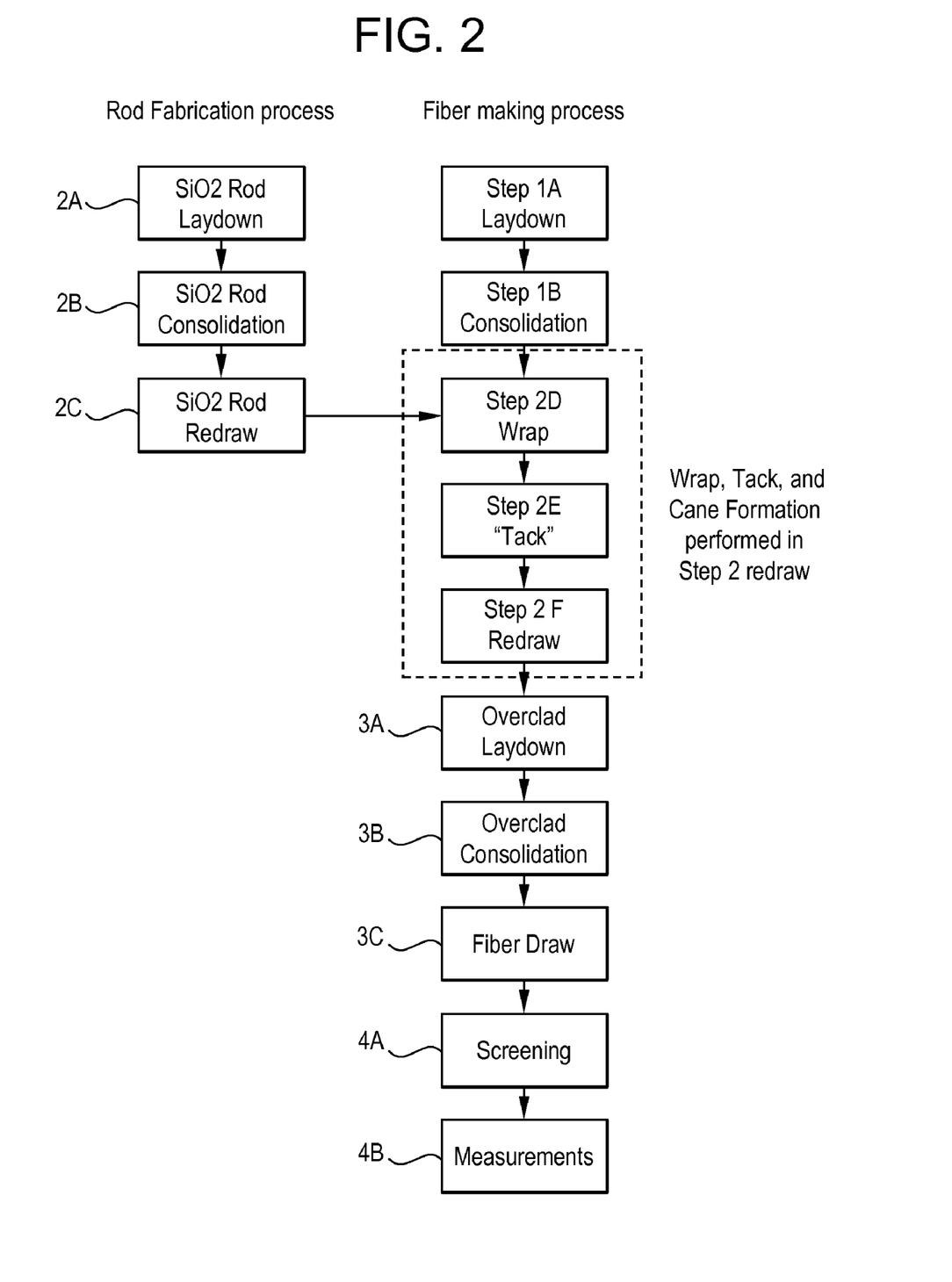
FIG. 2 illustrates schematically one embodiment of the method of making an optical fiber with airlines.

In accordance with one embodiment of the present invention, as shown in FIG. 2 a method of making an optical fiber 10 comprises the steps of:
  (i) Providing a sintered core blank 55 (which can be produced, for example, by steps 1A and 1B shown in FIG. 2).
  (ii) Wrapping (step 2D of FIG. 2) the sintered core blank 55 with a rod ribbon 60 containing at least 50 (and preferably at least 75, more preferably at least 100) glass:
    (a) rods 65A (which can be produced, for example, by steps 2A-2C shown in FIG. 2), or
    (b) tubes 65B (not shown), or
    (c) a combination of rods and tubes,
  in order to produce a wrapped preform 66.
  (iii) Heating (Step 2E of FIG. 2) the wrapped preform 66 so as to fuse or otherwise attach at least a portion of each of the rods and/or tubes to (a) the core blank 55 and/or (b) to at least one other rod or tube, thereby creating a core blank assembly 70. For example, the first row of rods and/or tubes will be at least partially attached to the core blank 55 and to the rods and/or tubes of the second row, while the second row of rods and or tubes will be tacked to the first row of rods and/or tubes and to the next row of rods and/or tubes. Each of the following rows of rods and/or tubes, except for the last row will be tacked (attached) to the preceding row of rods and/or tubes and to the subsequent row of rods and/or tubes.
  (iv) Re-drawing the core blank assembly 70 to create a smaller diameter cane 75 (Step 2F of FIG. 2). That is, cane 75 has a smaller outer diameter than the core blank assembly 70. The glass cane 75 will comprise a core blank portion and one or more rows of tubes and/or rods attached to one another. According to some exemplary embodiments of the present invention, the core blank assembly 70 is capped during the re-draw step, or is pressurized (positive pressure is applied) in order to keep the interstitial holes open.

Figure 7:
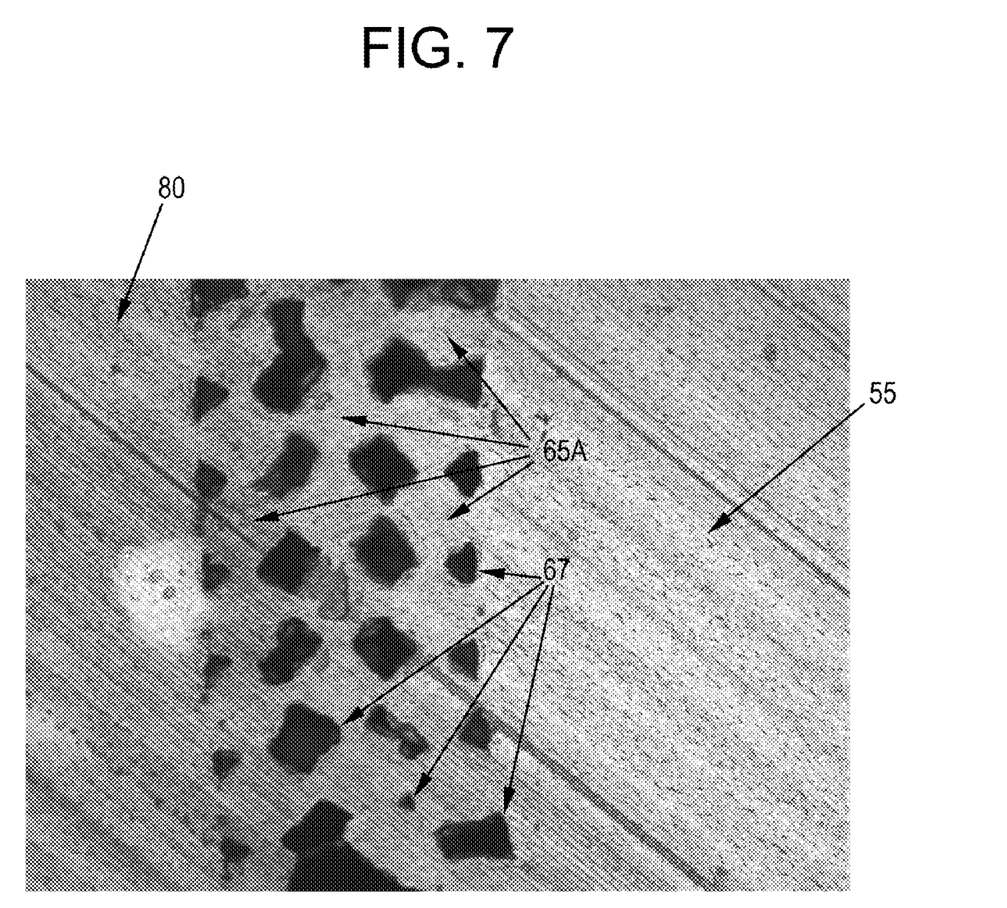
FIG. 7 is a photograph of the enlarged cross-sectional portion the final preform corresponding to the cane of FIG. 6.

According to some exemplary embodiments the redrawn (smaller) cane 75 is overclad with glass soot 78 (Step 3A of FIG. 2), and is then consolidated (Step 3B of FIG. 2) to create the final preform blank 50 (see FIG. 7). Applicants discovered that surprisingly the glass soot can deposited by a standard deposition process (e.g., OVD) directly on the uneven surface provided by the outer layer of rods and/or tubes, and that the soot 78 can then be consolidated into solid glass (overclad layer 80) by a standard consolidation process, while the interstitial voids between the rods (or tubes) remain open, to form the airlines 20 in the resultant fiber 10. Thus, advantageously, this method introduces airlines 20 into optical fiber 10, and can be used as an alternative to other methods of making fibers that contain airlines. (For example, it results in fiber(s) that can be used as an alternative to a fiber with random voids of short length (10 m or less).) In this example, the airlines 67 within the cane 75 are formed by the spaces between the rods 65A or tubes 65B. Additional airlines may be formed between rods and tubes or by the cavities within the tubes, however it is preferable to use simple silica rods, not expensive tubes, to generate the airlines 67 within the cane 75. The airlines 67 of cane(s) 75 correspond to the airlines 20 of the optical fiber(s) 10.

The outer surface of the redrawn cane 75 is uneven due to the presence of the rods, and the diameter of the cane 75 may vary up to 1%, but preferably by less than 0.75%. This diameter variation is essentially periodic or semi-periodic, and is based on the size of the rods and their location relative to the adjacent rods. For example, in one embodiment, the average diameter of the cane 75 was 10 mm (10000 μm) and the average diameter variation (Δ diameter) was 56 μm. Thus, in this example, the diameter of the cane 75 was uneven and varied by 0.56% (56 μm/10000 μm). The cane 75 was overclad with silica soot 78 (not shown) which was then consolidated into solid glass (overclad layer 80) to create the preform blank 50. This preform blank 50 can then be utilized for drawing of optical fiber 10 (Step 3C of FIG. 2.) Other steps, such as fiber measurement and screening (Step 4A and 4B of FIG. 2) may also be performed during or after the fiber draw step (Step 3C).

It is noted that the redrawn cane 75 can also be inserted into an overclad tube, heated in order to bond it to the tube to form a preform blank 50, and then drawn into fiber 10. However, one advantage of using standard OVD laydown to deposit soot over the rods 65A, is that costly rod-in-tube processing is avoided. Therefore, the preferred embodiments of the present method do not require the purchase or manufacture of high quality large diameter overclad tube(s) required to contain the plurality of smaller diameter rods or tubes by the "rod-in-tube" processing methods. These embodiments of the method according to the present invention also advantageously avoid the expensive rod stacking step(s) utilized in rod-in-tube manufacturing.

Preferably the length of the airlines extends throughout the fiber length. Because the present method results in a substantially predetermined and continuous array of airlines the optical fiber 10 can be drawn at high speeds However, it is also understood that instead of rods 65A with the length that equals or is longer the length of the core blank, shorter rods 65A may be stacked length-wise, creating at least some airlines that may not extend throughout the fiber's length (i.e., in this case the airlines 20 may not be continuous in length).

One advantage of the present method is that this method enables the fiber to have a high air fill fraction (AFF ≧0.1%) in the cladding ring 18. The AFF the cladding ring 18 is preferably >0.1%, more preferably >0.5%, even more preferably >1% and still more preferably >2%. This air fill fraction AFF enables low bend loss (i.e., bend loss below 1 dB/turn at 10 mm diameter and/or <0.2 dB/turn at 20 mm diameter. Preferably, according to some embodiments, the bend loss is less than 0.1 dB/turn at 20 mm diameter.

In addition, the present method provides one or more of the following advantages:
1. A substantially uniform, predetermined (designed) airline structure that can be scaled up or down based on the diameters of rods 65A (or tubes 65B), and/or the change in airline sizes during the redraw step.
2. A way to mechanically create the airlines in a relatively low manual labor operation as compared to standard stack and draw processes, resulting in a less expensive fiber;
3. It enables standard soot overclad (technical and commercial) for low cost processing as compared to the cost tube used in standard rod and tube processes;
4. The preform can be designed and assembled to provide for optimum core blank diameter, filler rod diameter, and void space requirements.

The invention will be further clarified by the following exemplary method of making optical fiber.

EXAMPLE 1

For example, in order to produce a fiber similar to that of FIG. 1A, the core blank 55 was wrapped in a ribbon 60. The ribbon 60 contained a plurality of glass rods 65A. This ribbon was wrapped around the core blank 50 four times, producing the wrapped preform. The wrapped preform was heated by a flame torch to soften the glass sufficiently so as to tack the rods 65A to each other and to the core blank 55 in order to produce the core blank assembly 70. This core blank assembly was then redrawn to a smaller diameter cane 75, while maintaining the relative interstitial spaces between the glass rods. The cane 75 was than overclad with glass soot (in this example it was pure silica soot, but other dopants may also be present, e.g. chlorine, germanium, fluorine, boron and phosphorus) and consolidated to form the final consolidated glass preform blank 50. It is noted that the soot deposited on the cane 75, after consolidation, corresponds to the cladding 30 of fiber 10 of FIG. 1A.

More specifically, in this example we produced a fiber by wrapping a sintered core blank 55 with a plurality of solid rods 65A to produce the wrapped preform. (See FIGS. 3 and 4) The wrapped preform was heated to tack the rods to the blank and to each other. The resultant core blank assembly was redrawn to a cane, which was then overclad as a normal cane. The size of the rods and their separation determined the size and amount of airspaces that were needed to give the fiber 10 the desired void fraction (AFF) in the annular ring 18.

As stated above, the airlines resulted from the interstitial spaces between rods 65A. Alternatively or in addition, tubes 65B can be used instead of rods for increased air fill. Glass rods are cheaper than glass tubes, and their use is adequate for most applications. The preform can be designed and its size selected to optimize for core blank diameter, filler rod diameter, and void space requirements.

As noted previously, fibers with random voids can be produced by trapping multitudes of gas bubbles in a glass that are pulled into gas filled voids of random size, length, and axial distribution within a void containing region. According to the exemplary embodiments of the present invention, airlines 20 are produced by utilizing rods, tubes or a combination thereof with predetermined sizes with respect to the core to provide a narrower range of airline sizes with more radial and axial uniformity than those in fibers with random voids. The airlines of fibers 10 are usually continuous along the length of the fiber. (Note: a broken rod may result in an airline that is discontinuous along the length of the fiber). The ease of manufacturing resulted from rolling the rods around the core preform also results in some variability in the rod placement, which leads to some range and variability in airline sizes, but this variability is relatively small when compared to the variability of voids in the fiber with random voids.

PBG fiber stack and draw methods result in far more ordered and precise airline placement than that resulted from the method(s) of manufacturing fiber 10 described herein. Each rod or tube used in PBG fiber stack and draw method(s) is required to be in a precise lattice structure, which leads to exacting precision of process and placement, and typically requires subsequent processing to obtain extremely high air-fill fractions (like etching processes). Thus, while the voids in the PBF are highly periodic, and the airlines in the present invention, the airlines 20 are distributed with less precision than the voids in PDF, or "semi-randomly".

EXAMPLE(s)

Figure 3:
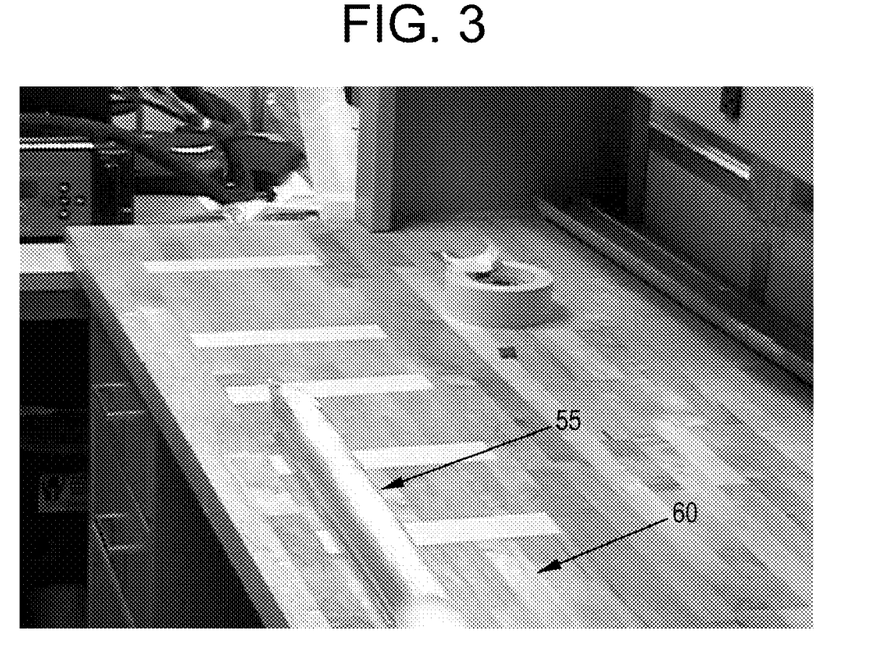
FIG. 3 is a photograph illustrating a 47 mm diameter sintered core blank placed on a ribbon comprising 1 mm diameter solid silica rods.

In this example, the silica rods 65A are positioned next to each other on a flat surface and the ends of the rods 65A are taped or bound together to make a continuous ribbon of glass rods. This is shown in FIG. 3. Then the core blank 55 is laid on top of the ribbon and is rolled up "sushi-style" to obtain the desired number of layers, resulting in a wrapped preform. Note, as shown in this photograph (FIG. 3), we utilized a re-cycled draw blank for this experiment—hence the tapered draw root end. In preferred embodiments, a uniform diameter core cane 55 would be wrapped inside the roll of rods 65A in a similar fashion.

Figure 4:
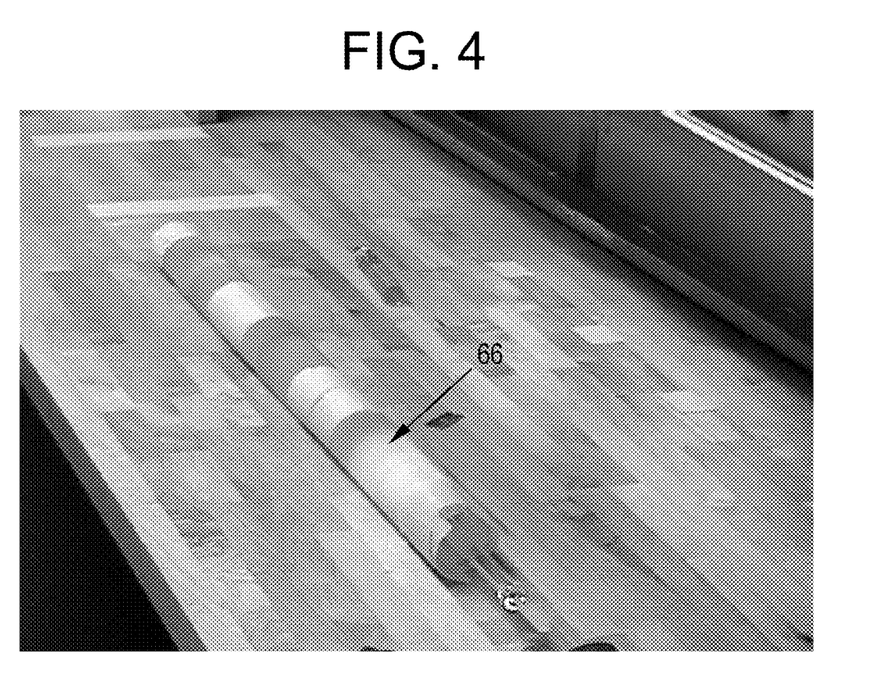
FIG. 4 is a photograph of a silica rod ribbon wrapped around the core blank shown in FIG. 2.

The wrapped preform shown in FIG. 4. Although we had used tape (which can be subsequently burned off), epoxies or other ways of temporarily binding the rods together at the ends may also be utilized. Also, while several columns of tape were used in this example, only the ends of the rods need to be connected together. Alternatively, even the ends of the rods may not be required to be taped or bound together before the wrapped preform is tacked together with heat.

Subsequently, the wrapped preform of FIG. 4 was taken to a flame working lathe and the ends of the rods were tacked together and to the core blank. The tape was then removed. The partially tacked core blank assembly was then taken for experimentation to determine operating conditions for tacking the core blank assembly fully together.

In this exemplary embodiment, we utilized a precision redraw furnace to tack the rods 65A fully to each other (along the rod length) and to the core blank 55. Another option would be to make a simple and cheap induction coil and traverse apparatus to be used for this operation, rather than using a relatively expensive production redraw furnace.

More specifically, in this exemplary embodiment, in order to tack the rods 65A to each other and to the core blank 55, the entire core blank assembly was run through the furnace at 21.2 mm/min downfeed rate and at the temperature of 2000° C. The core blank assembly 70 was then cooled and examined. The rods 65A and the core blank were found to be fully tacked together (i.e., they were attached to one another along the entire length of the rods). It is noted that when the tacking process was performed at the same downfeed (DF) rate, but at the temperature of 1800° C., some rods were tacked together, and some were not. When the tacking process was performed at the same downfeed rate, but at the temperature of 1900° C., more rods were tacked together, but not all.

The next step was to determine how to redraw the almost 60 mm diameter core blank assembly 70 to a 10 mm diameter cane 75, while not melting the rods 65A so much as to close off the void spaces in between the rods. We utilized a precision redraw furnace. During the re-draw process, in order to keep the interstitials holes open, a high torque (15-100 Nm) is utilized. The optimum torque is a function of preform viscosity. High viscosity requires high torque. Both the redraw speed and redraw temperature control preform glass viscosity. For example, higher redraw speed leads to higher torque and higher temperature leads to lower torque. Capping the core blank assembly 70 during re-draw process to trap interstitial gases, or pressurizing interstitial gaps helps to keep the interstitial holes open and to promote the creation of the airlines in fiber 10. It is preferable, for some embodiments, that the torque during redraw is in the 15 to 100 Nm range, for example 15 Nm to 50 Nm, or 20 Nm to 50 Nm, or 25 Nm to 50 Nm.

Figure 5:
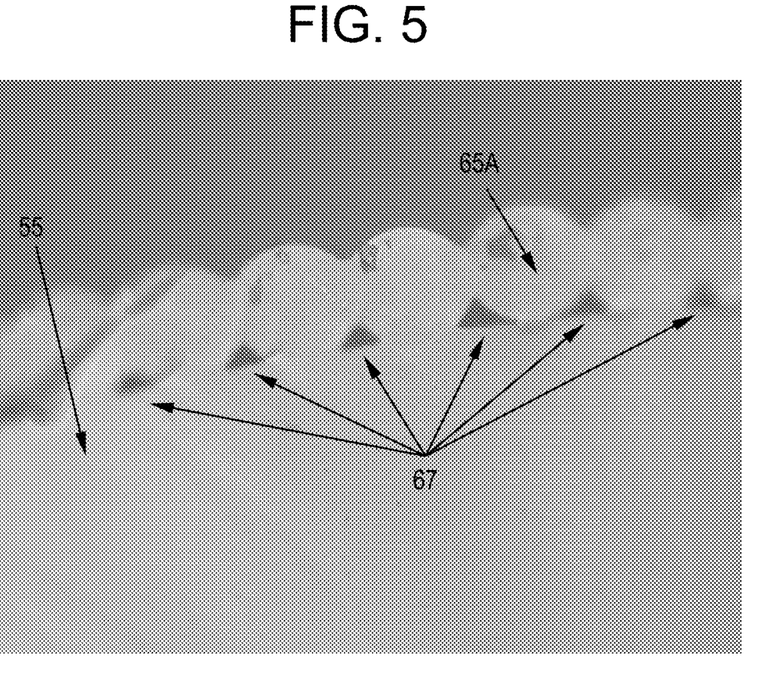
FIG. 5 is a photograph of a 10 mm diameter cane, with a single layer of silica rods attached to the core blank.

Table 2 depicts two exemplary re-draw conditions. In this embodiment the gob temperature was set to 2150° C. Note the set points, such as for downfeed (DF) rate, were controllable only to a single degree C., but reportable to the hundredths. The first set of conditions (#1) was not successful because many of the interstitial holes closed. The second set of redraw conditions (#2) was successful, and the (smaller diameter) redrawn cane 75 retained the interstitial holes. FIG. 5 is a photograph of an enlarged cross-section of one exemplary 10 mm diameter redrawn cane 75 (which includes a core blank portion with one row of rods tacked thereto), and corresponds to the redraw step under condition #2 (see Table 2). This figure shows that the interstitial spaces between the rods and the core blank were maintained after the re-draw step. More specifically, the interstitial spaces shown in this photograph (FIG. 5) are about 26 μm to 36 μm in height (radial distance) and about 25 μm to 65 μm in width (along the periphery of the portion corresponding to the core blank).

TABLE 2

| | | Cane redraw | | | |
|---|---|---|---|---|---|
| Conditions | DF rate (mm/min) | Furnace Temp (° C.) | Tractor Speed (mm/min) | Torque (Nm) | Comments |
| #1 | 3.06 | 2001 | 125 | 14.1 | voids gone |
| #2 | 6.12 | 1998 | 250 | 28.2 | Excellent void control |

Figure 6:
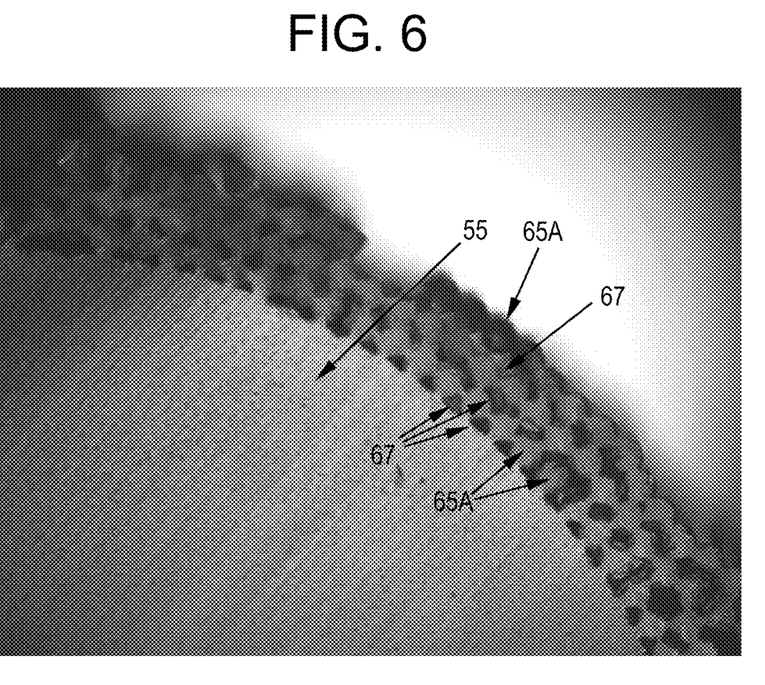
FIG. 6 is a photograph of the enlarged cross-sectional portion of a 10 mm fiber cane with three layers of silica rods attached to and surrounding the core blank. The dark areas represent interstitial spaces between the rods.

After determining how to successfully build, tack and redraw canes for the fiber manufacturing process, we fabricated a final preform blank 50 with 3 to 4 rings of holes. A 40 mm diameter core blank 55 was wrapped with 1 mm diameter silica rods which overlapped to produce from 3 to 4 rows of holes. The photograph of FIG. 6 is a partial cross section of the "tacked assembly" after the redraw step i.e., the cross section of the resultant cane 75. Note that some portions of the rods are missing due to breakage when the cane 75 was cut with a saw to produce the photograph of FIG. 6. The scale length measurement in this photograph corresponds to 117 microns.

Note that the surface of the cane 75 was "rough" due to the presence of the rods. About 2700 grams of silica soot overclad 78 was applied to the 1 meter long, 10 mm diameter cane 75. Standard overclad consolidation of soot 78 was then successfully performed to produce an overclad layer 80. This layer 80 corresponds to the glass outer cladding 30 of the Fiber 10 of FIG. 1A. A cross section was taken from the tip and is shown in FIG. 7. The blank 50 was drawn into a fiber 10. The resultant fiber was a scaled down version of the fiber of FIG. 1A, with an outer diameter of 125 μm and an air filled fraction in region 18 greater than 1%.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method for making an optical fiber, said method comprising the steps of:
   (i) wrapping a sintered core blank with a rod ribbon containing at least 100 glass: (a) rods, (b) tubes, or (c) a combination of rods and tubes, to produce a wrapped preform;
   (ii) heating the wrapped preform to a heating temperature to at least partially attach each of the rods or tubes to (a) the core blank and/or (b) to at least one other rod or tube, thereby creating a core blank assembly;
   (iii) re-drawing the core blank assembly to produce a smaller diameter cane.

2. The method of claim 1, wherein said cane is: overclad with glass soot and consolidated to create a final preform blank.

3. The method of claim 2, further including the step of drawing an optical fiber from said final preform blank.

4. The method of claim 1, wherein said rod ribbon is wrapped around said core blank at least 3 times.

5. The method of claim 1 wherein the outer diameter D of said core blank is at least 10 times the average outer diameter d of said rods or tubes.

6. The method of claim 5 wherein the outer diameter D of said core blank is at least 20 times the average outer diameter d of said rods or tubes.

7. The method of claim 5 wherein the outer diameter D of said core blank is at least 30 times the average outer diameter d of said rods or tubes.

8. The method of claim 1 wherein the average outer diameter d of said rods or tubes is not greater than 2 mm.

9. The method of claim 1 wherein said heating temperature is between 1900° C. and 2100° C.

10. The method of claim 1 wherein the Torque during said redraw step is at least 15 Nm.

11. The method of claim 10 wherein the Torque during said redraw step is greater than 20 Nm and less than 100 Nm.

12. An optical fiber produced by the method of claim 1.

13. The optical fiber of claim 12 wherein optical fiber comprises:
   (i) a core;
   (ii) a cladding surrounding the core; wherein the cladding comprises a cladding ring that:
      (a) has a width W of less than 10 microns;
      (b) includes at least 50 airlines, each airline having a maximum diameter or a maximum width of not more than 2 microns and more than 50% of said airlines have a length of more than 20 m;
      (c) has an air fill fraction of 0.1% to 10%, and
      (d) has an inner radius $R_{in}$ and an outer radius $R_{out}$, wherein 6 µm$\leq R_{in} \leq$14 µm, and 8 µm$\leq R_{out} \leq$14 µm; and
   (iii) an outer cladding surrounding said cladding ring.

14. The optical fiber of claim 13, wherein said annular cladding ring comprises at least 200 airlines.

15. The optical fiber of claim 12 wherein optical fiber comprises:
   (i) a core;
   (ii) a cladding surrounding the core; wherein the cladding comprises a cladding ring that:
      (a) has a width W not greater than 10 microns;
      (b) includes at least 50 airlines, each airline having a maximum diameter or a maximum width of not more than 2 microns and more than 50% of said airlines are continuous along the axis of the optical fiber;
      (c) has an air fill fraction of 0.1% to 10%, and
      (d) has an inner radius $R_{in}$ and an outer radius $R_{out}$, wherein 6 µm$\leq R_{in} \leq$14 µm, and 8 µm$\leq R_{out} \leq$14 µm; and
   (iii) an outer cladding surrounding said cladding ring.

\* \* \* \* \*